US006513775B1

(12) United States Patent
Hostetler

(10) Patent No.: US 6,513,775 B1
(45) Date of Patent: Feb. 4, 2003

(54) APPARATUS AND METHOD FOR STANDING CRUTCHES

(76) Inventor: Rosalea Hostetler, 121 W. Main, Harper, KS (US) 67058

(*) Notice: Subject to any disclaimer, the term of this patent is extended or adjusted under 35 U.S.C. 154(b) by 0 days.

(21) Appl. No.: 09/902,179

(22) Filed: Jul. 10, 2001

(51) Int. Cl.[7] .................................................. F16B 45/00

(52) U.S. Cl. .................... 248/304; 248/231.81; 135/65; 135/66

(58) Field of Search ........................ 248/229.16, 229.26, 248/231.81, 230.7, 304; 135/65, 66, 67, 68, 82, 75

(56) References Cited

U.S. PATENT DOCUMENTS

| | | | | |
|---|---|---|---|---|
| 593,978 A | * 11/1897 | Boehm | .................. | 248/229.26 |
| 751,942 A | 2/1904 | Renno | | |
| 979,959 A | 12/1910 | Johnson | | |
| 2,197,279 A | 4/1940 | Thorssen | | |
| 2,208,195 A | 7/1940 | Paul | | |
| 2,423,635 A | 7/1947 | Blum | | |
| 2,495,889 A | * 1/1950 | Connaghan | .................. | 135/49 |
| 2,553,730 A | 5/1951 | Taylor | | |
| 3,606,898 A | * 9/1971 | Harocopo | .................... | 135/49 |
| 4,091,828 A | 5/1978 | Jorgensen | | |
| 4,428,390 A | 1/1984 | Baird | | |
| 4,526,187 A | 7/1985 | Ciullo | | |
| 4,788,969 A | * 12/1988 | Thompson | ................... | 128/78 |
| 4,826,151 A | * 5/1989 | Nuredin | ....................... | 272/93 |
| 4,895,330 A | 1/1990 | Anstead | | |
| 5,000,418 A | * 3/1991 | Vogt | ........................... | 248/689 |
| 5,313,971 A | 5/1994 | Upshaw | | |
| 5,339,849 A | * 8/1994 | Stutz | ........................... | 135/66 |
| 5,351,701 A | 10/1994 | Hsiao | | |
| 5,456,437 A | 10/1995 | Chander | | |
| 5,577,697 A | * 11/1996 | Accordino | ............... | 248/206.5 |
| 5,639,055 A | 6/1997 | Fritz | | |
| 5,706,845 A | * 1/1998 | Beyar et al. | .................. | 135/67 |
| 5,875,805 A | 3/1999 | Nichols | | |
| 5,983,912 A | 11/1999 | Leu | | |
| D418,286 S | 1/2000 | Skeppstedt | | |
| 6,082,384 A | * 7/2000 | Cheng | ......................... | 135/66 |
| 6,125,867 A | 10/2000 | Ishizaka | | |
| D438,372 S | * 3/2001 | Taylor | .......................... | D3/10 |
| 6,308,840 B1 | * 10/2001 | Mulholland et al. | ....... | 211/70.2 |

FOREIGN PATENT DOCUMENTS

| | | | | |
|---|---|---|---|---|
| DE | 4111322 | * 4/1991 | ............ | 248/229.26 |
| DE | 19651569 | * 12/1996 | ............ | 248/229.26 |

* cited by examiner

*Primary Examiner*—Kimberly Wood
(74) *Attorney, Agent, or Firm*—Kenneth H. Jack; Davis & Jack, L.L.C.

(57) ABSTRACT

An apparatus and method for standing a first crutch and a second crutch, each crutch having a front and a rear bow, each bow having an upper end and a lower end, each crutch having an arm piece spanning between the upper ends of its front and rear bows, and each crutch having a foot piece spanning between the lower ends of its front and rear bows, the apparatus and method comprising elements and steps of providing a "U" bracket, the "U" having a front arm and a rear arm, said arms defining a crutch foot receiving space; mounting the "U" bracket between the front and rear bows of the first crutch so that the front and rear arms of the "U" bracket extend upwardly; extending the foot piece and lower bow ends of the second crutch into the crutch foot receiving space of the "U" bracket; and placing the arm piece of the second crutch and the foot piece of the first crutch upon a ground surface, allowing the first crutch and second crutch to stand, supporting each other, in an "X" configuration.

12 Claims, 4 Drawing Sheets

APPARATUS AND METHOD FOR STANDING CRUTCHES

FIELD OF THE INVENTION

This invention relates to crutches utilized in assisting handicapped or disabled persons in ambulation. More particularly, this invention relates to apparatus and methods for temporary storage of such crutches while not in use.

BACKGROUND OF THE INVENTION

Crutches commonly utilized for ambulatory assistance are typically used in pairs, each crutch comprising a front bow having an upper end and a lower end, a rear bow having an upper end and a lower end, an arm piece spanning between and interconnecting the upper ends of the front and rear bows, a foot piece spanning between and interconnecting the lower ends of the front and rear bows, and a hand piece spanning between the front and rear bows, the hand piece being positioned at an approximate midpoint between the arm piece and the foot piece. Typically, the hand piece and arm piece of such crutch are wider than its foot piece, causing the front and rear bows of the crutch to extend upwardly from its foot piece in a "V" configuration.

Handicapped or disabled persons utilizing crutches such as described above commonly ambulate with crutch assistance to a resting point such as a restaurant dinner table or a classroom desk. Upon arriving at such resting point, the user of the crutches typically removes the crutches from beneath the user's arms and allows a hand opposite the user's disabled foot or leg to rest upon the desk or dinner table. The crutch user then seats him or herself utilizing one hand and a non-disabled leg for bodily support, and utilizing the other hand to hold the pair of crutches. Upon seating, the crutch user typically wishes to be freed of the task of manually holding the pair of crutches.

Two known methods of freeing such a seated crutch user from manually holding his or her crutches are lying the crutches upon the floor or propping the crutches on the desk or table. Lying the crutches on the floor undesirably creates a tripping hazard for others, and propping the crutches upon the desk or table undesirably interferes with the use of the desk or table.

The instant inventive apparatus and method for standing crutches conveniently allows such a seated crutch user to free his or her hands from holding crutches, while avoiding undesirable results described above. Such objectives are achieved by providing a removably attachable bracket which enables the crutches to support each other, standing in an "X" configuration.

BRIEF SUMMARY OF THE INVENTION

The apparatus of the instant inventive apparatus and method for standing crutches preferably comprises a "U" bracket having a front arm and a rear arm. Preferably, said arms are spaced apart so that they define a crutch foot receiving space having a lateral dimension slightly greater than the combined lateral widths of the lower bow ends and crutch foot of a common crutch as described above. Such sizing of the "U" bracket allows the "U" bracket to be conveniently placed between the upper ends of the front and rear bows of such crutch.

The preferred "U" bracket may suitably further comprise a cross member extending between the upper ends of its front and rear arms, causing the "U" bracket to have an eye or "O" configuration. However, such "O" configuration may undesirably hinder insertion of a crutch foot into the crutch foot receiving space, making the unobstructed "U" configuration preferred.

Means for mounting the "U" bracket between crutch bows are necessarily provided. Preferably, such means comprises front and rear extension arms, said arms respectively having front and rear ends, said arms being fixedly attached to and respectively extending forwardly and rearwardly from the "U" bracket. Said means preferably further comprises front and rear bow engaging shoes, each shoe supporting a flexible strap having flexible hook and loop pads attached thereto (commonly known as velour crochet or "velcro").

While the front and rear extension arms may suitably extend forwardly and rearwardly from any point along the front and rear arms of the "U" bracket, said extension arms preferably extend from the base of said arms, allowing the base of the "U" bracket and the front and rear extension arms to be fabricated from a single crossbar. Adoption of such crossbar configuration conveniently allows the front and rear arms of the "U" bracket to be configured as front and rear posts extending upwardly from such crossbar. Such crossbar configuration also beneficially facilitates an adaptation of the front or rear extension arms to serve as a telescoping width adjusting means, allowing attachment of the apparatus between the front and rear bows of crutches having varying widths.

While the preferred bow attaching means comprises flexible straps having flexible hook and hook engaging loop pads, numerous alternate bow attaching means may be suitably utilized. For example, buckles may be used for securing straps. For further example, "C" clips fitted for engagement with the front and rear bows of a crutch may be mounted upon the distal ends of the front and rear extension arms of the inventive crutch standing apparatus. As a further example, where the extension arms are adapted to telescopingly extend, an outwardly biasing spring may be applied to the extension arms, and friction pads may be applied to the distal ends of the extension arms. Such configuration allows installation of the "U" bracket between the bows of a crutch in the manner of a common pressure rod. As a further example, slip joint or slip sleeve and slipping brackets may be attached to the distal ends of the extension arms and to the bows of the crutch. As a further example, snap ridge and snap channel or snap head and snap aperture attachment assemblies may be applied to the distal ends of the extension arms and to the bows of the crutch. As a further example, the "U" bracket may be attached between the bows of the crutch by means of spirally threaded screws or spirally threaded nut and bolt combinations. All such common attaching means utilizable for removably attaching the "U" bracket to the bows of the crutch are considered to fall within the scope of the invention.

In use of the inventive crutch standing apparatus, assuming that the preferred flexible hook and hook engaging loop pad attaching means is utilized, the "U" bracket is placed between the bows of a first crutch, and the "U" bracket is oriented so that the apparatus's front and rear extension arms contact the inner surfaces of the crutch's bows, and so that the front and rear arms of the "U" bracket extend upwardly. Thereafter, the front and rear flexible straps are wrapped around the front and rear bows, allowing the flexible hook and hook engaging loop pads to secure the straps around the bows, securing the crutch standing apparatus in place. Thereafter, a second crutch is inverted, and its lower crutch end, consisting of its front and rear lower bow ends and foot piece, is extended into the crutch foot receiving space of the crutch standing apparatus. Upon such placement, the front and rear arms of the "U" bracket engage the outer side walls of said second crutch's front and rear bows. Thereafter, the first and second crutches are splayed into an "X" configuration, and the foot piece of the first crutch and the arm piece of the second crutch are allowed to rest upon a ground or floor surface. Thereafter, the first and second crutch support each other, standing in a convenient "X" configuration.

Accordingly, it is an object of the present invention to provide a "U" bracket structure and method steps which allow a first and a second crutch to stand, supporting each other, in an "X" configuration.

It is a further object of the present invention to provide such an apparatus which is conveniently attachable to and removable from a common crutch.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
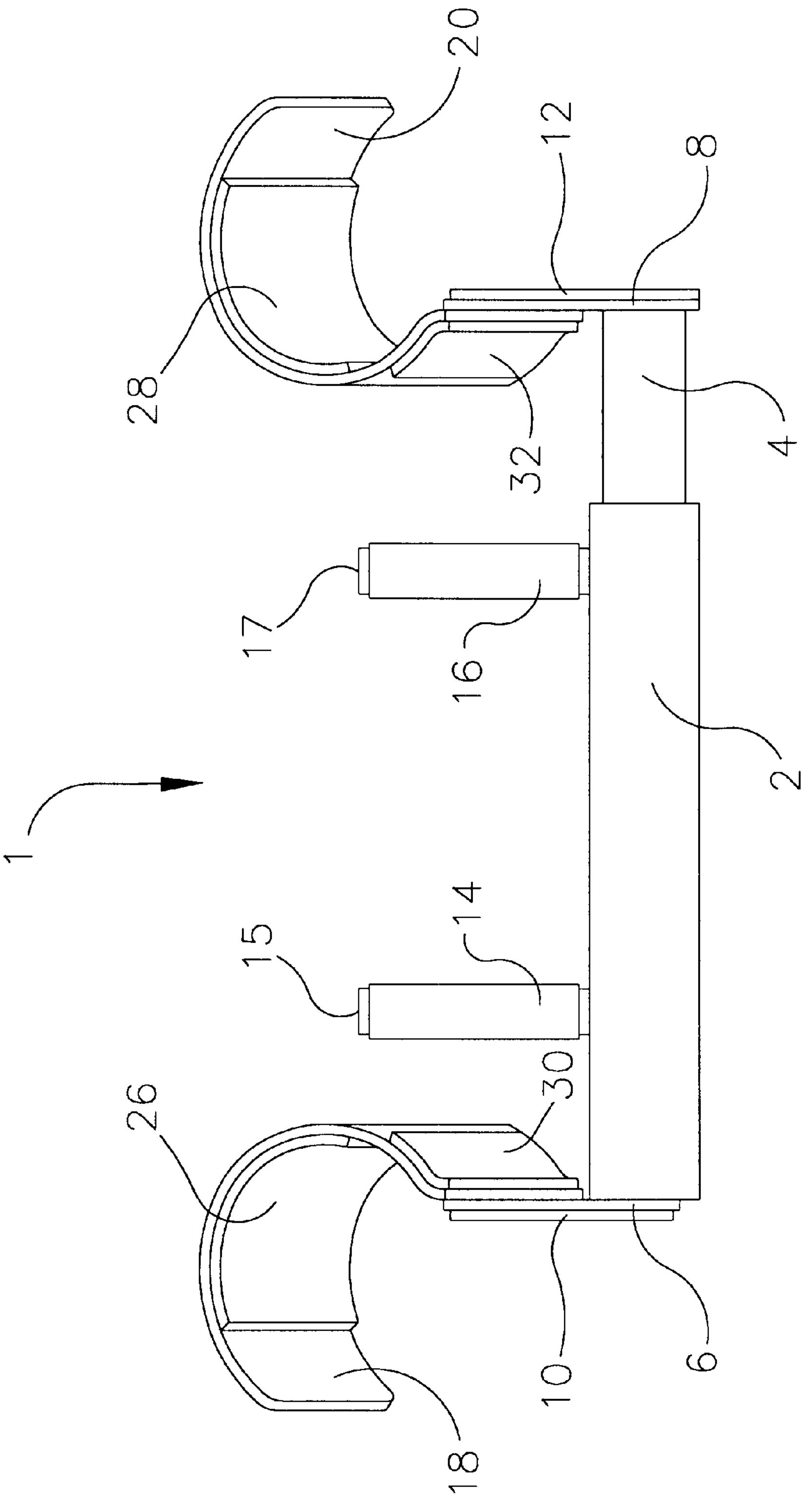
FIG. 1 is a side view of the apparatus of the instant inventive apparatus and method.
Figure 2:
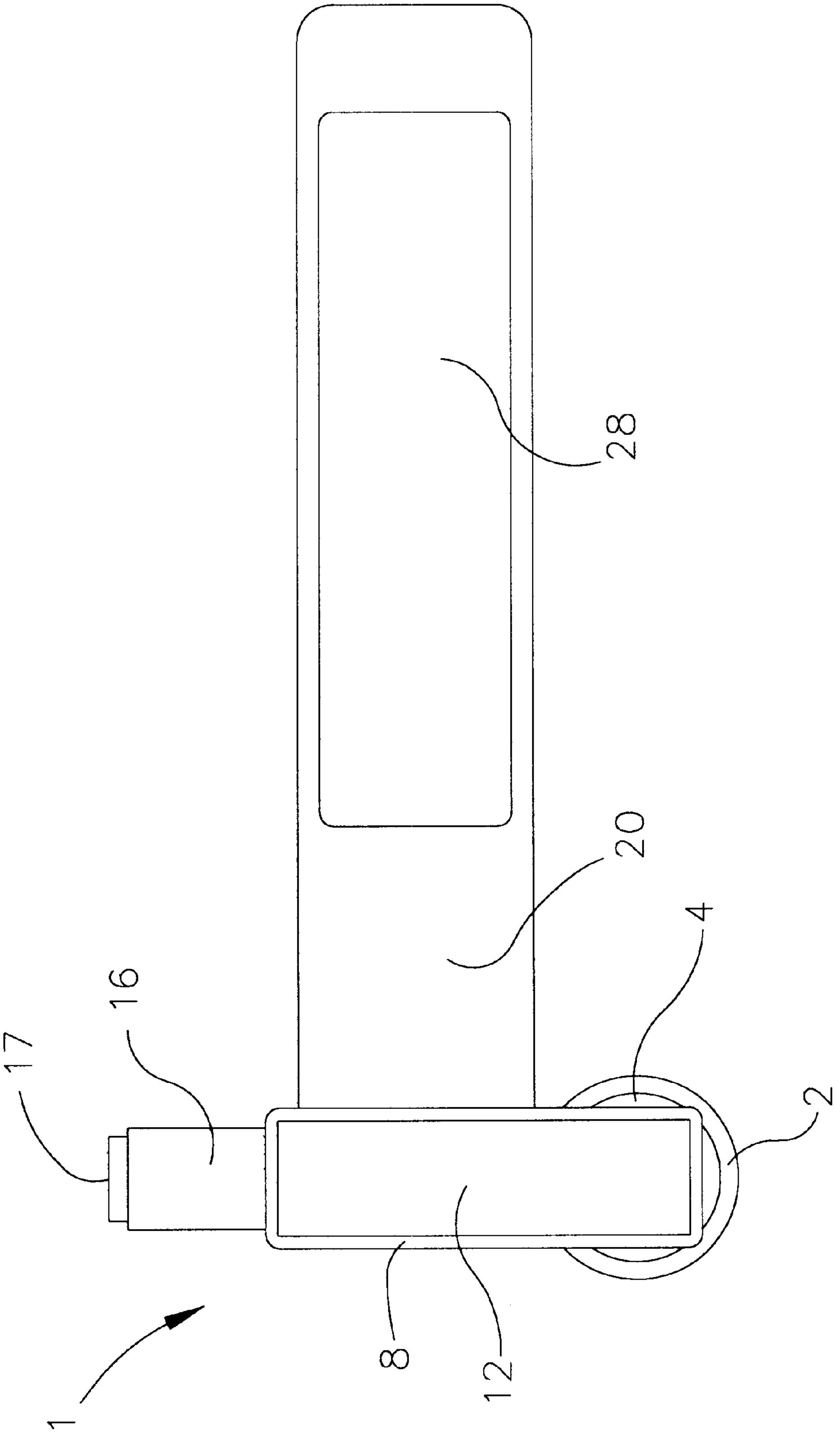
FIG. 2 is an end view of the apparatus depicted in FIG. 1.

Referring now to the drawings, and in particular to FIG. 1, the crutch standing apparatus of the instant inventive apparatus and method is referred to generally by reference arrow 1. Said apparatus 1 has a crossbar 2, preferably tubular, said crossbar preferably having a rear extension arm 4 telescopingly mounted within the rearward end of crossbar 2. The front end of crossbar 2 similarly forms a front extension arm. Front and rear arms or posts 15 and 17 are fixedly mounted, preferably by means of heat fusion welding, upon crossbar 2 so that arms 15 and 17 extend upwardly. Arms 15 and 17 in combination with crossbar 2 form a "U" bracket, said bracket defining a crutch foot receiving space between arms 15 and 17. Rubber sleeves 14 and 16 are preferably respectively mounted over arms 15 and 17, such sleeves enhancing frictional contact between arms 15 and 17, and a crutch foot extended into the crutch foot receiving space.

Further referring to FIG. 1, contact feet 6 and 8 are fixedly attached, preferably by means of heat fusion welding, respectively to the front end of crossbar 2, and to the rear end of extension arm 4. Preferably, rubber friction pads 10 and 12 are respectively adhesively attached to the outwardly facing surfaces of contact feet 6 and 8, such friction pads enhancing frictional contact with inner surfaces of front and rear bows of a crutch.

Referring further to FIG. 1, flexible straps 18 and 20, preferably woven nylon, are fixedly attached, preferably by means of riveting, to contact feet 6 and 8. Flexible straps 18 and 20 preferably have adhesively attached flexible hook pads 30 and 32 and hook engaging loop pads 26 and 28.

Figure 3:
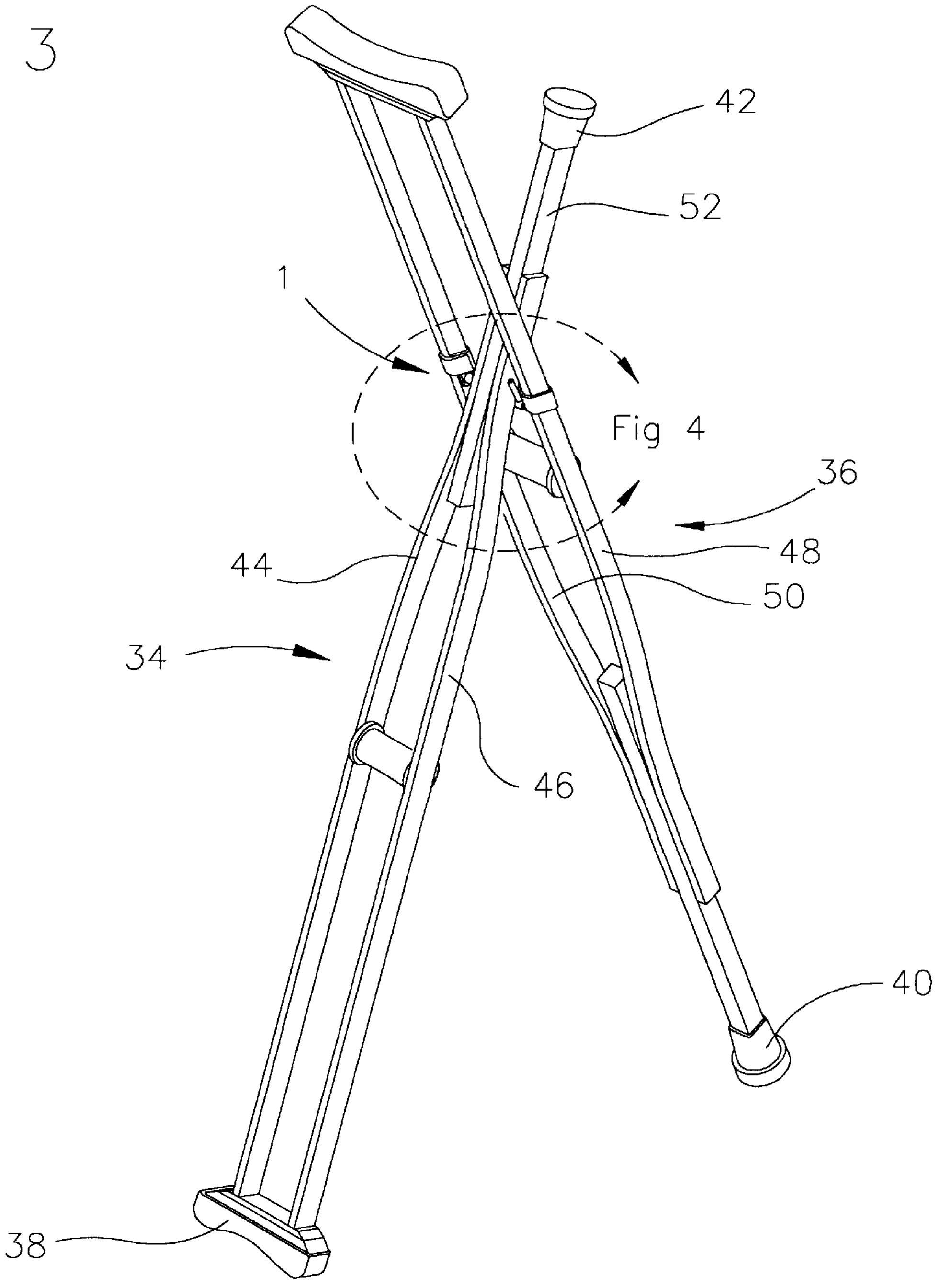
FIG. 3 is a perspective view of the apparatus depicted in FIG. 1, said apparatus shown in use upon crutches.

Referring to FIG. 3, the inventive crutch standing apparatus 1 is preferably utilized in conjunction with common crutches 34 and 36, such crutches having front bows 44 and 50, rear bows 46 and 48, foot pieces 52, and arm pieces 38. In use of the instant invention, referring simultaneously to FIGS. 1, 3, and 4, extension arm 4 is slidably moved into tubular crossbar 2 until the distance between friction pads 10 and 12 is less than the interior distance between the upper ends of bows 48 and 50. Thereafter, the crutch standing apparatus 1 is placed between said bows, and extension arm 4 is slidably moved outwardly until friction pads 10 and 12 contact the inner surfaces of bows 50 and 48. Upon such positioning, straps 18 and 20 are firmly wrapped around bows 50 and 48 until hook engaging loop pads 26 and 28 engage with hook pads 30 and 32, resulting in a firm removable attachment of the crutch standing apparatus 1 upon crutch 36 as depicted in FIGS. 3 and 4.

Figure 4:
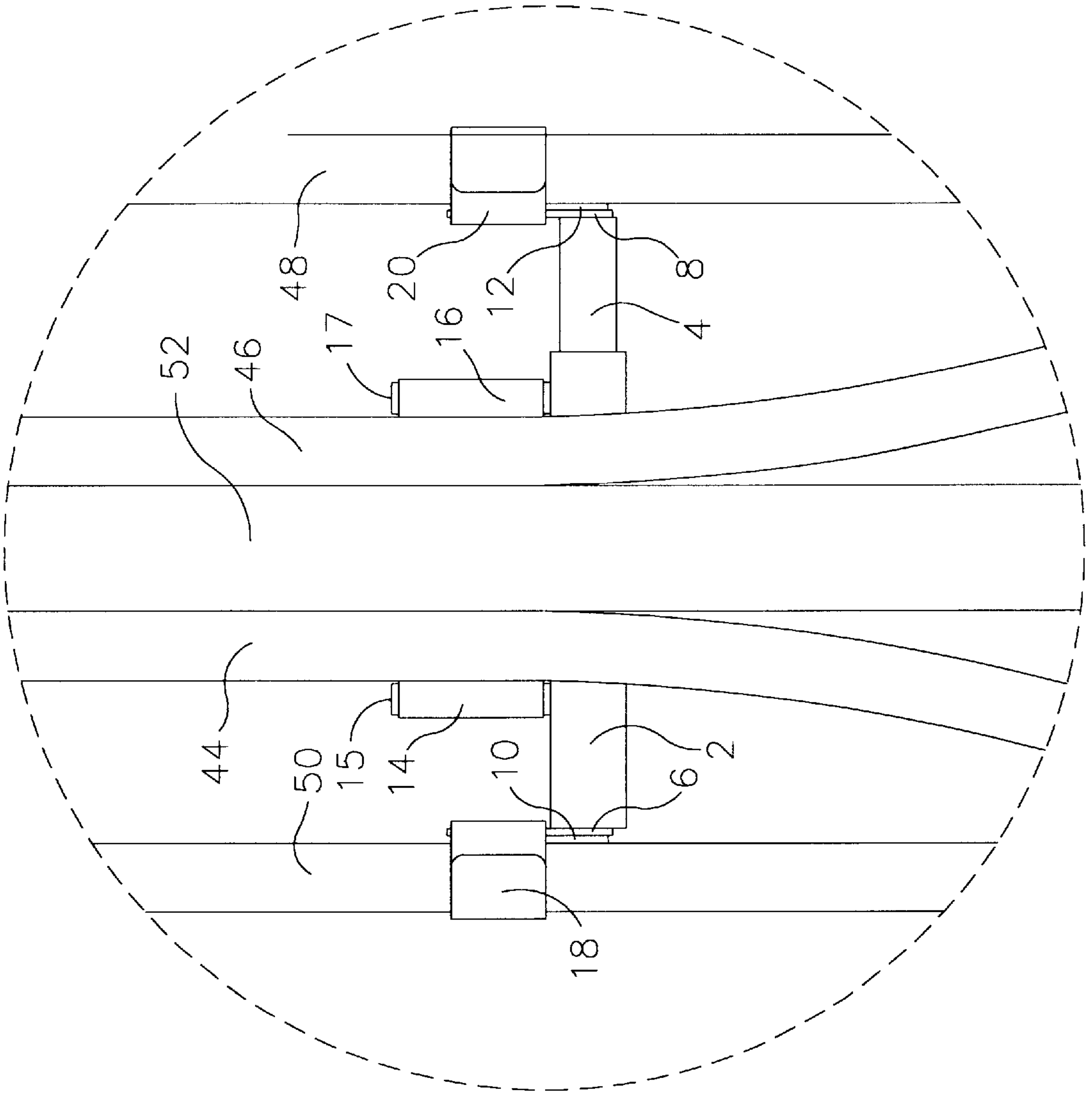
FIG. 4 is a magnified view as indicated in FIG. 3.

Upon mounting of crutch standing apparatus 1 as depicted in FIGS. 3 and 4, crutch 34 is inverted and its upwardly extending crutch foot is extended into the crutch foot receiving space defined by arms 15 and 17. Thereafter, crutches 34 and 36 are splayed into an "X" configuration as depicted in FIG. 3, and arm piece 38 and foot piece 40 are placed upon a floor or ground surface. Upon manual release of crutches 34 and 36, so configured, they support each other, standing in the depicted "X" configuration.

While the principles of the invention have been made clear in the above illustrative embodiment, those skilled in the art may make modifications in the structure, arrangement, portions components and method steps of the invention without departing from those principles. Accordingly, it is intended that the description and drawings be interpreted as illustrative and not in a limiting sense, and that the invention be given a scope commensurate with the appended claims.

I claim:

1. A crutch standing apparatus for removable attachment between front and rear crutch bows of a common crutch, the crutch standing apparatus comprising:

(a) a "U" bracket having a forward end, a rearward end, a forward arm, and a rearward arm, each arm having an upper end, the forward and rearward arms defining a crutch foot receiving space adapted for receiving a crutch foot of a second crutch;

(b) front crutch bow mounting means fixedly attached to the forward end of the "U" bracket the front crutch bow mounting means being adapted for interconnecting the forward end of the "U" bracket and the front crutch bow of the common crutch ; and (c) rear crutch bow mounting means fixedly attached to the rearward end of the "U" bracket the rear crutch bow mounting means being adapted for interconnecting the rearward end of the "U" bracket and the rear crutch bow of the common crutch.

2. The crutch standing apparatus of claim 1 wherein the front and rear crutch bow mounting means respectively comprise front and rear extension arms, the front extension arm having a front end and the rear extension arm having a rear end.

3. The crutch standing apparatus of claim 1 wherein the front and rear crutch bow mounting means comprise fasteners selected from the group consisting of flexible hook and hook engaging loop pads, buckles, C-clips, friction pads, slip joint brackets, snap ridge and snap channel combinations, snap head and aperture combinations, slip pin and slip sleeve combinations, spirally threaded screws, and spirally threaded bolt and nut combinations.

4. A method of standing a first crutch and a second crutch, each crutch having a front and a rear bow, each bow having an upper end and a lower end, each crutch having an arm piece spanning between the upper ends of its front and rear bows, and each crutch having a foot piece spanning between the lower ends of its front and rear bows, the method comprising steps of:

a) providing a "U" bracket, the "U" having a front arm and a rear arm, said arms defining a crutch foot receiving space;

b) mounting the "U" bracket between the front and rear bows of the first crutch so that the front and rear arms of the "U" bracket extend upwardly;

c) extending the foot piece and lower bow ends of the second crutch into the crutch foot receiving space of the "U" bracket; and placing the arm piece of the second crutch and the foot piece of the first crutch upon a ground surface or floor surface, allowing the first crutch and second crutch to stand, supporting each other, in an "X" configuration.

5. A crutch standing apparatus for removable attachment crutch, between front and rear crutch bows of a common the crutch standing apparatus comprising:

a) a crossbar having a front end and a rear end;

b) front and rear posts, each post having an upper end and a lower end, the lower end of each post being fixedly attached to the crossbar, the front and rear posts defining a crutch foot receiving space;

c) front crutch bow mounting means fixedly attached to the front end of the crossbar; and d) rear crutch bow mounting means fixedly attached to the rear end of the cross bar.

6. The crutch standing apparatus of claim 5 wherein the front and rear crutch bow mounting means comprise fasteners selected from the group consisting of flexible hooks and hook engaging loop pads, buckles, "C" clips, friction pads, slip joint brackets, snap ridge and snap channel combinations, snap head and aperture combinations, slip pin and slip sleeve combinations, spirally threaded screws, and spirally threaded bolt and nut combinations.

7. A method of standing a first crutch and a second crutch, each crutch having a front and a rear bow, each bow having an upper end and a lower end, each crutch having an arm piece spanning between the upper ends of its front and rear bows, and each crutch having a foot piece spanning between the lower ends of its front and rear bows, the method comprising steps of:

a) providing a crossbar having front and rear posts extending therefrom, said posts defining a crutch foot receiving space;

b) mounting the crossbar between the front and rear bows of the first crutch so that the front and rear posts extend upwardly;

c) extending the foot piece and lower bow ends of the second crutch into the crutch foot receiving space defined by the front and rear posts; and d) placing the arm piece of the second crutch and the foot piece of the first crutch upon a ground surface or floor surface, allowing the first crutch and second crutch to stand, supporting each other, in an "X" configuration.

8. A crutch standing apparatus for removable attachment between front and rear crutch bows of a common crutch, the crutch standing apparatus comprising:

(a) a "U" bracket having a forward arm and a rearward arm, each arm having an upper end, the forward and rearward arms defining a crutch foot receiving space; and (b) bow mounting means fixedly attached to the "U" bracket; the bow mounting means comprising front and rear extension arms, the front extension arm having a front end and the rear extension arm having a rear end; the bow mounting means further comprising front and rear flexible straps respectively fixedly attached to the front and rear ends of the front and rear extension arms.

9. The crutch standing apparatus of claim 8 wherein the front or the rear extension arm is further telescopingly attached to the "U" bracket.

10. The crutch standing apparatus of claim 9 when the bow mounting means further comprises flexible hook pads and hook engaging loop pads fixedly attached to the front and rear flexible straps.

11. A crutch standing apparatus for removable attachment between front and rear crutch bows of a common crutch, the crutch standing apparatus comprising:

a) a crossbar having a front end and a rear end;

b) front and rear posts, each post having an upper end and a lower end, the lower end of each post being fixedly attached to the crossbar, the front and rear posts defining a crutch foot receiving space;

c) bow mounting means fixedly attached to the front and rear ends of the crossbar; and d) telescoping means operatively connected to the crossbar, said means allowing alternate lengthening and shortening of the crossbar.

12. The apparatus of claim 11 wherein the bow mounting means further comprises flexible hook pads and hook engaging loop pads fixedly attached to the flexible straps.

* * * * *